(No Model.) 7 Sheets—Sheet 1.

S. BRAGGINS.
LASTING MACHINE.

No. 443,351. Patented Dec. 23, 1890.

Witnesses:
James F. Duhamel.
Horace A. Dodge.

Inventor
Seth Braggins
by Dodge Sons
Attys.

(No Model.)  7 Sheets—Sheet 3.

S. BRAGGINS.
LASTING MACHINE.

No. 443,351.  Patented Dec. 23, 1890.

Fig. 3.

Witnesses:
James F. Duhamel
Horace A. Dodge

Inventor:
Seth Braggins
by Dodge & Sons
Attys.

(No Model.)

S. BRAGGINS.
LASTING MACHINE.

No. 443,351. Patented Dec. 23, 1890.

Witnesses:
James F. Dunham
Horace A. Dodge

Inventor:
Seth Braggins
by Dodge Sons, Attys.

(No Model.) 7 Sheets—Sheet 5.

S. BRAGGINS.
LASTING MACHINE.

No. 443,351. Patented Dec. 23, 1890.

Witnesses:
James F. Duhamel
Horace A. Dodge.

Inventor
Seth Braggins,
by Dodge Sons,
Attys.

(No Model.) 7 Sheets—Sheet 6.

S. BRAGGINS.
LASTING MACHINE.

No. 443,351. Patented Dec. 23, 1890.

Witnesses:
James F. Duhamel
Horace A. Dodge

Inventor
Seth Braggins,
by Dodge Sons
Attys.

(No Model.)  7 Sheets—Sheet 7.

S. BRAGGINS.
LASTING MACHINE.

No. 443,351.  Patented Dec. 23, 1890.

Witnesses:
James F. Duhamel
Horace A. Dodge.

Inventor:
Seth Braggins
by Dodge Sons,
Attys.

UNITED STATES PATENT OFFICE.

SETH BRAGGINS, OF ROCHESTER, NEW YORK, ASSIGNOR TO WILLIAM S. KING, OF MINNEAPOLIS, MINNESOTA.

LASTING-MACHINE.

SPECIFICATION forming part of Letters Patent No. 443,351, dated December 23, 1890.

Application filed January 3, 1890. Serial No. 335,795. (No model.)

*To all whom it may concern:*

Be it known that I, SETH BRAGGINS, a citizen of the United States, residing at Rochester, in the county of Monroe and State of New York, have invented certain new and useful Improvements in Lasting-Machines, of which the following is a specification.

My invention relates to lasting-machines, and is designed, primarily, as an improvement upon the machine for which Letters Patent No. 387,366 were issued to Seth W. Paine, Hiram A. Gray, and Charles E. Pettee August 7, 1888.

A indicates a metallic frame supported by legs B, and comprising a horizontal bed portion C, an upright back plate D, and an overarching arm E, arranged substantially as in the patent above referred to.

Figures 1, 6, 7:
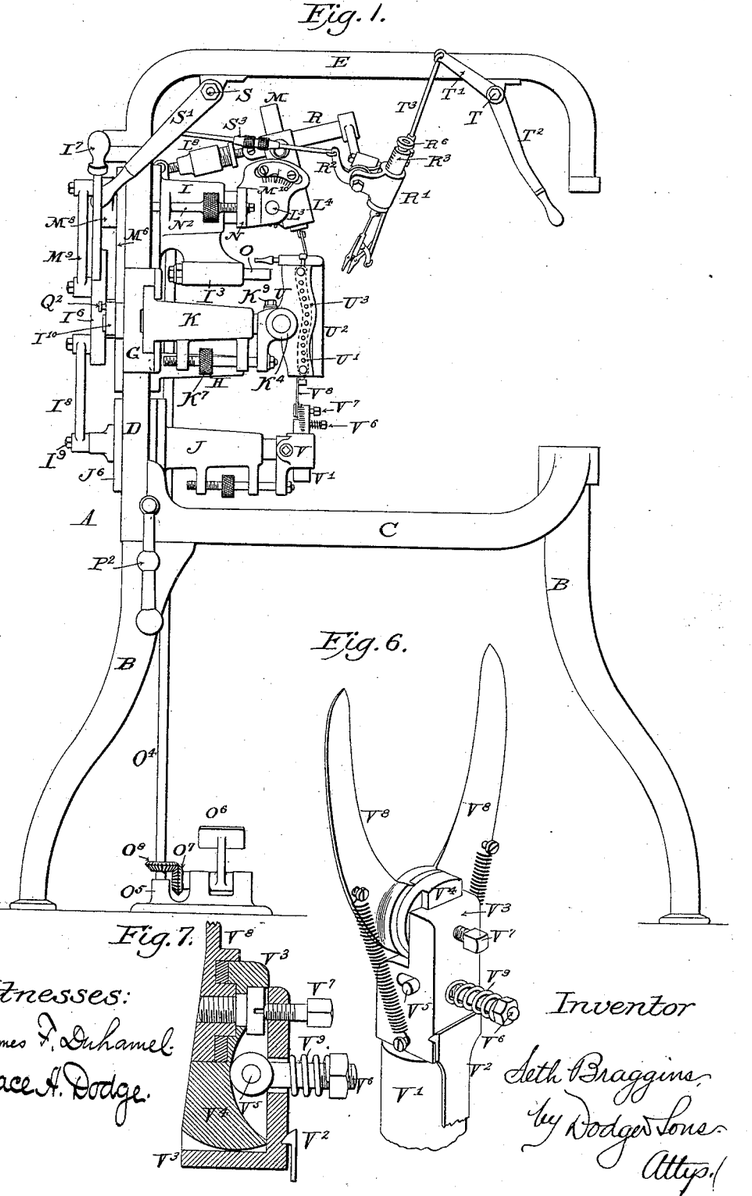
Figure 1 is a side view of so much of a lasting-machine as is necessary to illustrate my invention.
Figs. 6 and 7, respectively, perspective and sectional views of the heel-wipers.
Figure 2:
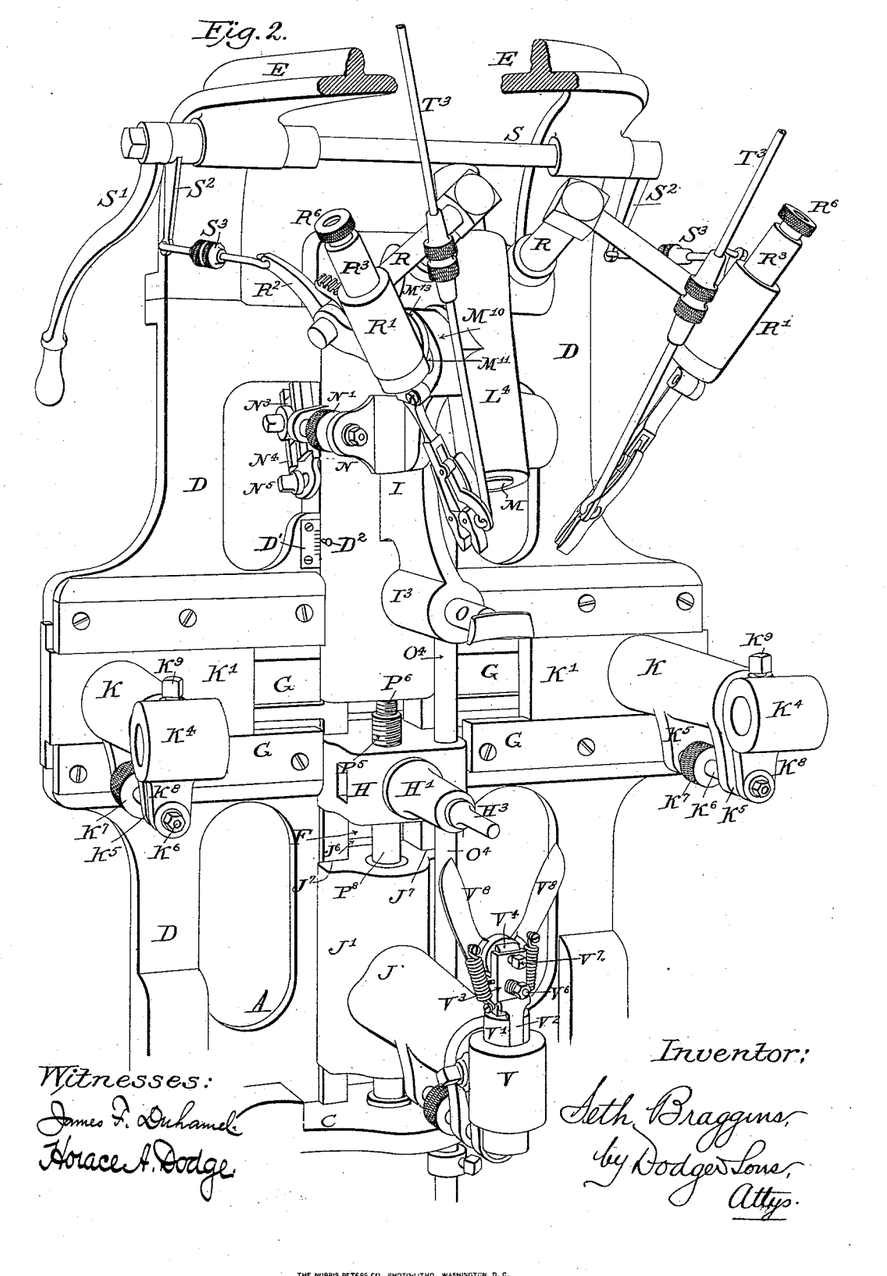
Fig. 2, a perspective view of a portion of the machine.
Figure 3:
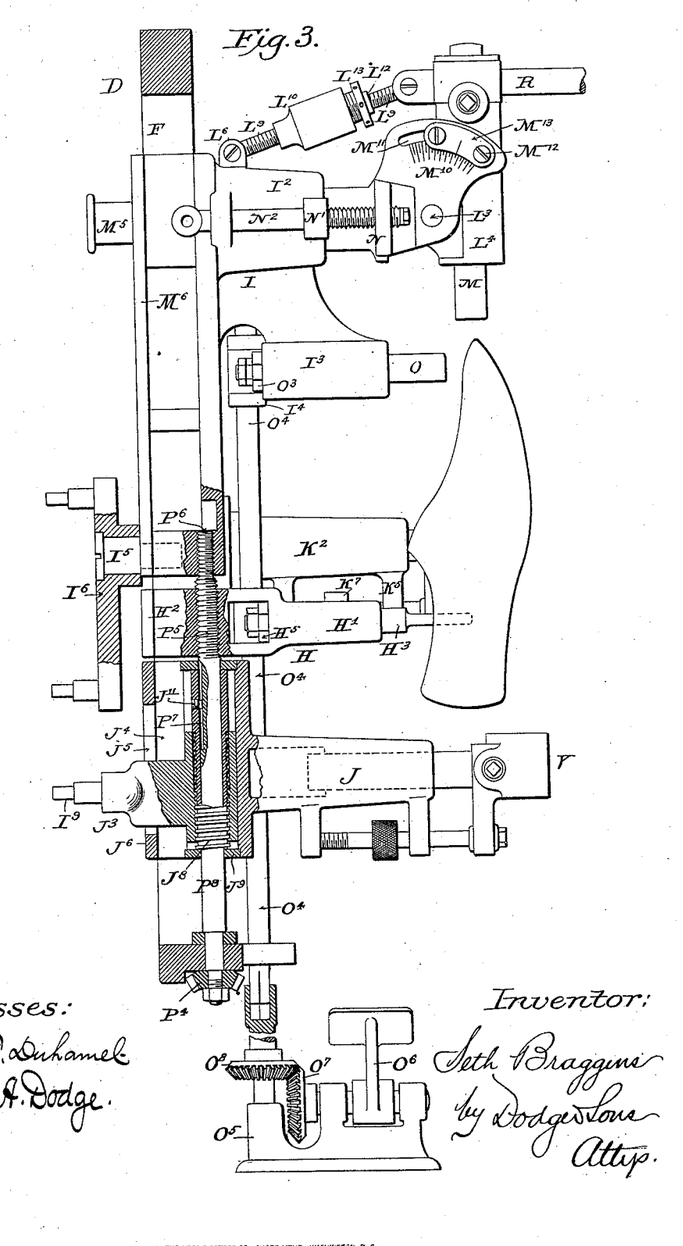
Fig. 3, a vertical sectional view through the back plate of the machine.

The back plate D is provided with a vertical slot F and with horizontal ways or guides G G, Figs. 1, 2, and 3, the former adapted to receive the last-support H, and the supports I and J for the toe and heel lasting devices, while the guides or ways G receive the supports K K for the side lasting-jaws.

Figures 13, 14, 15:
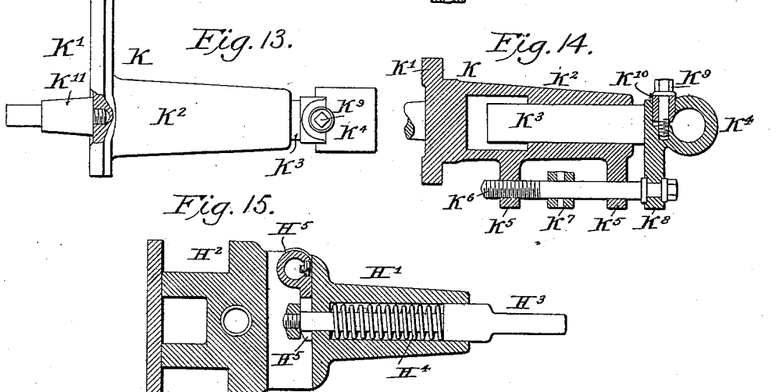
Figs. 13 and 14, views showing the construction of the supports for the side lasting-jaws.
Figs. 15 and 16, sectional views of the last-supporting arm.
Figure 16:
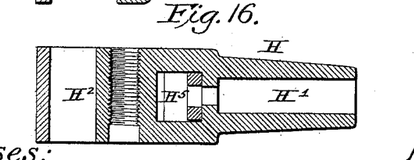

The supports K K are duplicates, and hence a description of one will be applicable to both. These supports comprise each a flat plate $K'$ to fit into the ways or guides G and a hollow arm $K^2$ to receive a stem $K^3$, (preferably cylindrical,) having at its outer end an eye $K^4$ to receive the stem of the jaw, as shown in Figs. 1, 2, 13, and 14. Upon the under side of arm $K^2$ are lugs $K^5 K^5$, in which is mounted a rod or stem $K^6$, the stem turning freely in one of the lugs, but being threaded to engage with the other lug, through which it passes, as shown in Fig. 14. Between the lugs $K^5$ the screw-stem $K^6$ is provided with a knurled collar $K^7$ or other means by which it may be turned.

The stem $K^3$ is provided with a perforated lug $K^8$ to receive the outer end of the screw $K^6$, the lug being embraced between collars upon the stem, so as to prevent longitudinal movement of the latter through the lug, but permitting it to turn freely therein.

From the foregoing it will be seen that by turning the screw-stem $K^6$ the stem $K^3$ carrying the jaw may be adjusted so as to bring the fingers or blades of the jaw into the same plane with the bottom of the last. In order to clamp the jaw-stem in the eye $K^4$ of the stem $K^3$, a screw $K^9$ is tapped into the body of the eye adjacent to its opening, and the said screw is encircled by a collar $K^{10}$, which intersects the opening or bore of the eye $K^4$, as shown in Figs. 13 and 14, so that when the screw is turned in one direction it will cause the collar to bear firmly against the shank of the jaw, and thereby firmly clamp the jaw in position.

Figures 4, 5:
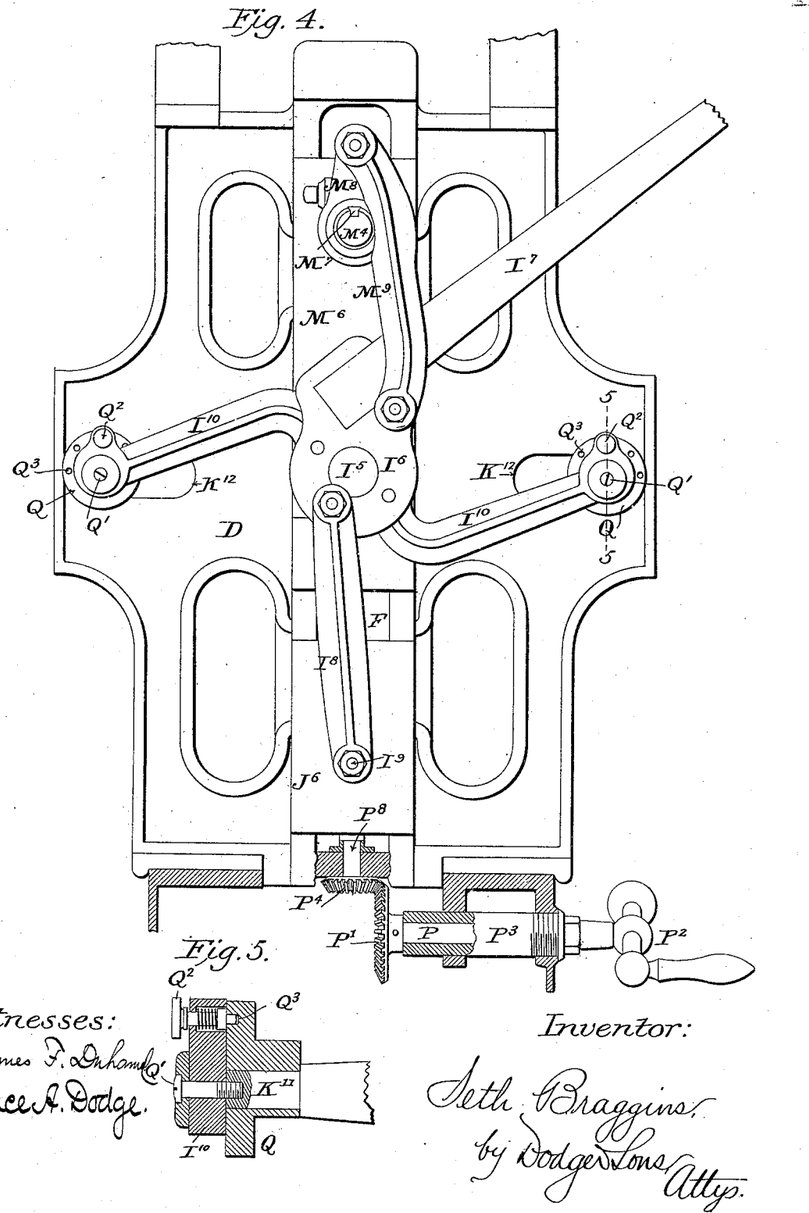
Fig. 4, a rear face view.
Fig. 5, a sectional view on the line 5 5 of Fig. 4.

Screwing into the back of the plate $K'$ of the support K is a stud or pin $K^{11}$, for a purpose presently explained, the back plate D being slotted, as at $K^{12}$, Fig. 4, to receive and permit the studs to slide horizontally with the supports.

The heel-former carrier J, Figs. 1, 2, 3, 11, and 12, resembles somewhat the supports K for the side jaws—that is to say, it is provided with a hollow arm to receive a stem or shank, which in turn receives the heel-lasting devices, and it is also provided with a screw for adjusting the said lasting devices toward and from or relatively to the bottom or heel of the last, and hence these parts need not be described.

Figure 11:
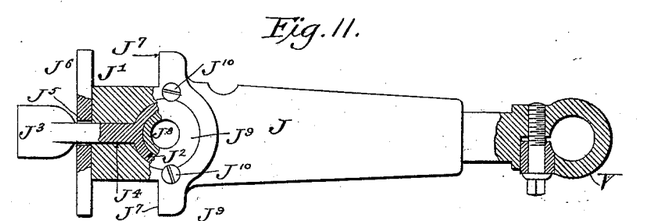
Figs. 11 and 12, views showing the construction of the support for the heel-wipers.
Figure 12:
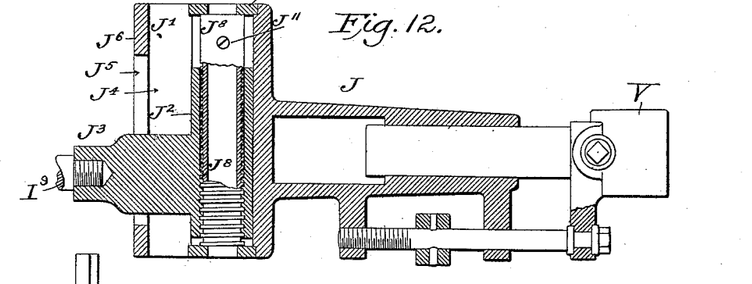

The support J is provided with a body portion J', designed to slide in the vertical slot F in the back plate D, the said body portion being cored out to receive a block or nut $J^2$, having a lateral arm or lug $J^3$, which projects outward through a slot $J^4$ in the rear face of the support and through a slot $J^5$ in a plate $J^6$, secured to the support, as shown in Figs. 3, 11, and 12. This plate, in conjunction with the flanges $J^7$, formed on the body of the carrier or support J, holds or clamps the latter to the upright plate D. Within the block or nut $J^2$ is a sleeve or tube $J^8$, threaded externally to engage the nut and prevented from longitudinal movement within the support or carrier J by means of collars or washers $J^9$ and screws $J^{10}$, or in any other suitable manner.

$J^{11}$, Figs. 3 and 12, indicates a screw carried by the sleeve or tube, the reduced end of the screw projecting into the interior of the sleeve to engage a slotted shaft $P^8$, for a purpose presently explained.

Figure 8:
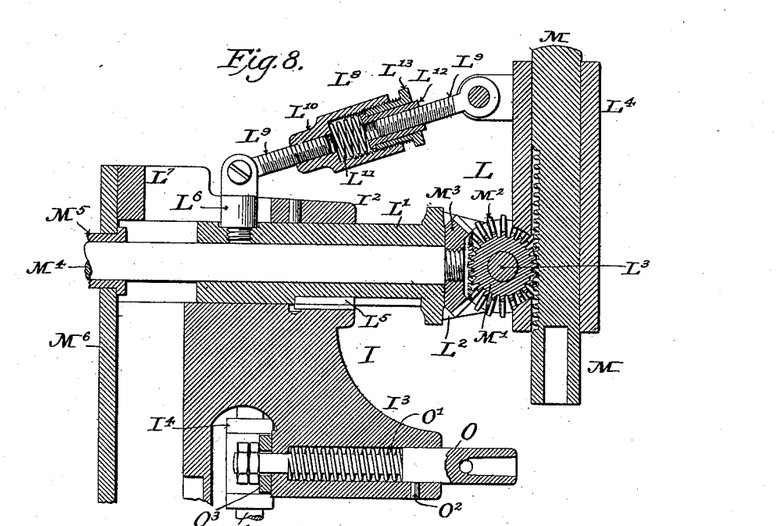
Figs. 8, 9, and 10, views illustrating the construction of the devices for supporting the toe-wipers.

The support or carrier I, Figs. 1, 2, 3, 8, and 9, for the toe-lasting mechanism comprises a body portion $I'$ to fit into the slot F in the upright plate D, a hollow arm $I^2$ to receive the stem or shank $L'$ of the frame or head L, that carries the toe-wipers, and finally a second hollow arm $I^3$ to receive the support O for the toe of the last, the inner end of the arm $I^3$ being set away from the front face of the body portion $I'$, as shown in Figs. 1, 3, and 8, and provided on its side with a bracket $I^4$. Secured to and projecting from the rear face of the body portion $I'$, or the plate $M^6$ carried thereby, is a stud $I^5$, upon which is mounted a plate or disk $I^6$, having a handle or lever $I^7$, as shown in Figs. 3 and 4. A link $I^8$ connects the cam-disk with the stud $I^9$, secured to the lug or arm $J^3$ of the support J, while links $I^{10}$ $I^{10}$ connect the plate or disk with the jaw-supports K K, as indicated in Fig. 4.

Figure 9:
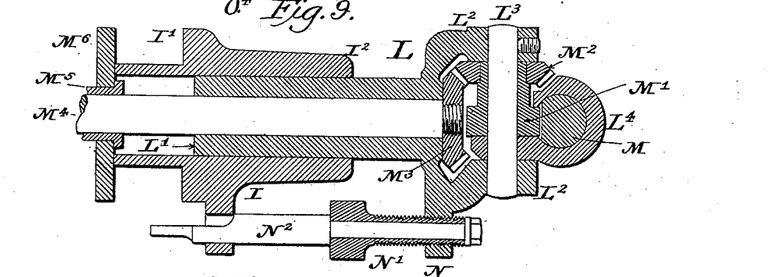

L, Figs. 8 and 9, indicates the toe-pinchers head provided with a hollow stem $L'$ to fit within the hollow arm $I^2$ and with separated arms $L^2$ $L^2$, carrying a pin $L^3$, upon which a tubular case or shell $L^4$ is adapted to swing. The stem $L'$ is guided in its movements by a spline or feather $L^5$, Fig. 8, and projecting from the upper face of the stem is a stud $L^6$, which works through a slot $L^7$ in the hollow arm $I^3$. This stud $L^6$ is connected with the upper end of the casing $L^4$ by an extensible and yielding connection $L^8$, comprising two rods $L^9$ $L^9$, a large hand-nut $L^{10}$, having a socket to receive a spring $L^{11}$ and screwing onto the end of one of the rods $L^9$, a flanged nut $L^{12}$, screwing onto the end of the other rod $L^9$ and bearing on the spring, and finally a hollow nut $L^{13}$, through which nut $L^{12}$ slides freely, screwing into the hand-nut $L^{10}$, as shown in Fig. 8. From this construction it is clear that the head or case $L^4$ may tip or rock upon its pivot $L^3$, and that in thus rocking or tipping the spring $L^{11}$ will yield or be compressed slightly in order that the toe-wipers (not shown) carried by the case or shell $L^4$ may adjust themselves automatically to the bottom of the last in case the latter should not be in line with the toe-wipers. It will also be noted that by turning the hand-nut $L^{10}$ in one or the other direction the case or shell $L^4$ and the wipers carried thereby may be given any desired inclination to correspond with the longitudinal curvature of the toe portion of the last.

Sliding in the shell or casing $L^4$ is the stock or shank that carries the toe-wipers, the stock consisting merely of a straight rack-bar M, provided on one face with teeth, with which a pinion $M'$, Figs. 8 and 9, mounted loosely on the pin $L^3$, engages. The hub of pinion $M'$ is elongated to receive or is provided with a bevel-gear $M^2$, Figs. 8 and 9, which latter meshes with a similar gear $M^3$ on the end of a shaft $M^4$, extending centrally through the hollow stem $L'$, so that as the shaft $M^4$ is rotated the rack-bar M, to which the toe-wipers are attached, will be projected from or withdrawn into the case or shell $L^4$. The shaft $M^4$ is designed to slide lengthwise with the head L, and to provide for this movement the rear end of the shaft is passed through a bushing $M^5$, which is carried by or journaled in the plate $M^6$, that clamps the support I to the back plate D. A spline or feather $M^7$, Fig. 4, permits the shaft to move lengthwise through the bushing, but prevents these parts from turning independently of each other.

Encircling or secured to the bushing $M^5$ is a crank-arm $M^8$, Figs. 1 and 4, which is connected with the cam-plate by means of a rod or pitman $M^9$. The head L is formed or provided with an upright plate $M^{10}$ on one side, having a curved slot $M^{11}$, Fig. 3, concentric with pin L, to receive one or more studs $M^{12}$, projecting from the side of the shell or casing $L^4$, the said studs or screws $M^{12}$ carrying a plate $M^{13}$, having a line or mark thereon, which in connection with the marks or graduations on the plate $M^{10}$ enables the operator to tell at a glance whether or not the head L is at the proper inclination.

Figure 10:
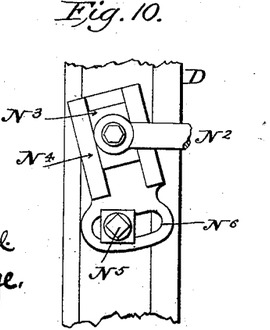

Projecting from the side of the hollow stem $L'$ is a lug N, which is threaded to receive a hollow sleeve or nut $N'$, which latter in turn receives a shouldered rod $N^2$, carrying a block $N^3$ to work in a pivoted guide-plate $N^4$, secured to the back plate D, as shown in Figs. 2 and 10. Plate $N^4$ is secured to plate D by means of a screw $N^5$ in such manner as to permit its inclination to be varied as desired, the plate being provided with a curved slot $N^6$ to receive a screw $N^5$, by which the plate may be clamped in different positions. If this plate $N^4$ be arranged in an inclined position and the support I be raised, the block $N^3$, working in the guide-plate $N^4$, will, acting through the connections $N^2$, $N'$, and N, draw the head L and attached parts inward within the hollow arm $I^2$, and when the support I is lowered the head L will be projected. By varying the inclination of the plate $N^4$ the degree and direction of the automatic movement of the head L may be controlled. This automatic inward and outward adjustment of the head L as the support for said head is raised and lowered is a matter of considerable importance, as I am thereby enabled to maintain the proper relative position between the devices carried by said head and the bottom of the last regardless of the length of the last. However, the head may be moved inward and outward manually to provide for the primary adjustment thereof by turning the nut N', which is held against longitudinal movement upon the rod $N^2$ by the means shown in Fig. 9.

In the hollow arm $I^3$ of the support I is mounted a rod or stem O (shown in Fig. 8) to receive the rest for the toe of the last, the stem or rod being urged outward by a spring O' and guided in its movements by a pin $O^2$. At its inner end the rod O is loosely connected with an arm $O^3$, secured upon the upper end of an upright shaft $O^4$, which latter is supported at said upper end of the bracket $I^4$, projecting from the side of the support I. This shaft $O^4$ passes vertically through the last-support H and is stepped at the lower end in a plate $O^5$, which will be secured in proper position upon the floor, as in Figs. 1 and 3.

In the plate or bracket $O^5$ is mounted a foot-treadle $O^6$, to the shaft or axis of which is secured a bevel-gear $O^7$, adapted to mesh with a similar gear $O^8$, secured to the shaft $O^4$, so that when the treadle is depressed the shaft will be partly rotated, but when the foot is removed the springs O' and $H^4$ will return the parts to their positions.

The last-support H comprises a hollow arm H' and a main body $H^2$ to work in the slotted back plate D, as shown in Figs. 2, 3, 15, and 16. Mounted and free to slide in the arm H' is a rod or stem $H^3$ to receive the last, the rod being urged outward by a spring $H^4$, seated in the arm and connected with an arm $H^5$, secured to the shaft $O^4$. Of course when the shaft $O^4$ is rotated, as above described, its arms $O^3$ and $H^5$ will draw the stems or rods O and $H^3$ inward into their respective arms $I^3$ and H' and will carry the last with them.

P, Fig. 4, indicates a shaft bearing at one end a bevel-wheel P' and at the other end a handle $P^2$, the shaft being mounted in a sleeve $P^3$, secured to the under side of the bed in line with the upright back plate D. The pinion P' meshes with a similar pinion $P^4$ on the lower end of a shaft $P^8$, which latter is journaled in the base-plate C, as shown in Fig. 4. This shaft $P^8$ is provided with right and left threaded portions $P^5$ and $P^6$ of different pitch, which engage, respectively, with the supports or carriers H and I. The shaft is also grooved longitudinally, as at $P^7$, to receive the set-screw $J^{11}$, carried by the sleeve $J^8$, as shown in Fig. 3, so that while the sleeve may rotate with the shaft it is also adapted to slide or move lengthwise thereon. As the shaft is rotated it turns the threaded sleeve $J^8$; but as the latter is prevented from moving endwise within the support J the rotation of the sleeve within the block $J^2$ will cause the latter to rise or fall, according to the direction of rotation. As the block or nut $J^2$ is connected with the cam-disk $I^6$ by means of the link $I^8$, it will, in being thus raised, turn or move the said disk slightly and cause the latter, through the links $I^{10}$, to move the jaw-supports K K inward toward each other. These supports K are adjustably connected with the links $I^{10}$, so that the inward movement may be compensated for. The turning of the screw-shaft to the right will raise the last-support H and lower the toe-lasting support or carrier I simultaneously with the raising of the block $J^2$ of the support J. The threads on the shaft and the sleeve vary in pitch in the proportions nine, twelve, and five, so that the block or nut $J^2$ will move upward farther than the support H, while the support I will move downward slower than the support H moves upward. In order that the adjustments of the supports may not affect the operation of the treadle-shaft $O^4$, the latter is made telescopic, as shown in Fig. 3. In order to vary the adjustment of the side jaws to cause one set of fingers to act in advance of the other set, or for any other reason, the stud $K^{11}$ of each support K receives an eccentric flanged collar Q and a stud or screw Q', that is connected by the link $I^{10}$ with the cam-plate, as shown in Figs. 4 and 5, the collar being free to turn on the screw or stud $K^{11}$, except when held against turning by means of the spring-pin $Q^2$. This spring-pin is carried by the head or enlargement of the link $I^{10}$ and is adapted to engage with any one of a series of holes or perforations $Q^3$ made in the flange of the collar. When the pin is withdrawn, the collar is free to be turned, and as a consequence the jaw-support will be moved toward or away from the center of the cam-disk, according to the direction in which the collar is turned.

Figure 19:
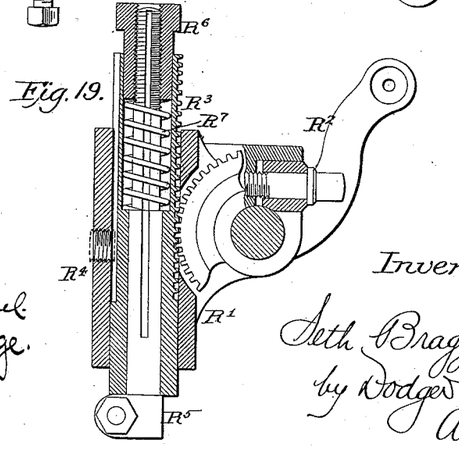

R R, Figs. 1, 2, and 3, indicate arms or brackets, that project from the sides of the shell or casing $L^4$ and carry the toe-pinchers heads R' R', the arm or bracket of each head serving not only as a support for the latter, but also as the axis of a sector-shaped rack $R^2$, Fig. 19, which engages with the toothed hollow sleeve $R^3$, which is designed to work longitudinally through the head R'. The sleeve is guided in its movements by a set-screw $R^4$ (shown in dotted lines in Fig. 19) and carries the pinchers-holder $R^5$, which latter is adjustably mounted in the sleeve. The upper end of the holder $R^5$ is threaded to receive a nut $R^6$, fitting into the end of the sleeve, a spring $R^7$ encircling the shouldered holder $R^5$ and bearing against the nut and the case or shell, as shown. If the strain on the leather should be too great, the spring will be compressed, so as to permit the hollow sleeve $R^3$ to move upon the holder $R^5$.

S, Figs. 1 and 2, indicates a shaft journaled upon the under side of the overarching arm E and provided with a hand-lever S' and two arms $S^2$ $S^2$, the said arms being connected by an adjustable connecting-rod $S^3$ with the arm of the sector-shaped wheel $R^2$.

T, Fig. 1, indicates a second shaft, also journaled upon the under side of the arm E and provided with arms T' and a handle or lever $T^2$, the arms T' being connected by extensible rods or connections $T^3$ with the operating lever or block of the pinchers carried by the head $R^4$, substantially as in the patent before referred to.

Figure 17:
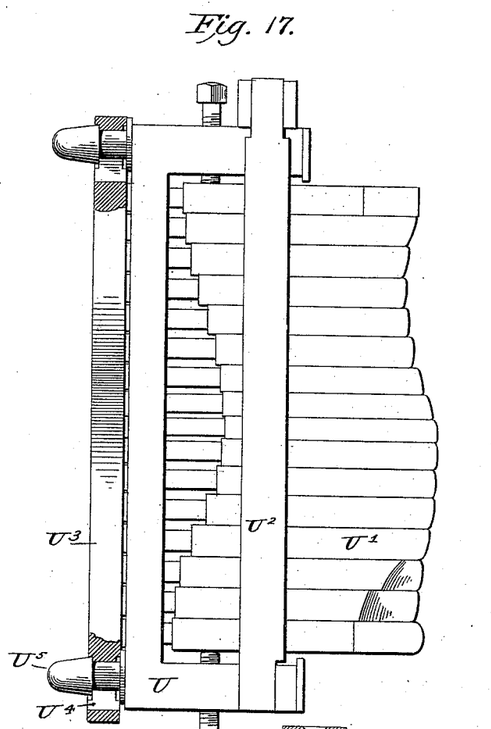
Fig. 17, a view of one of the side lasting-jaws with the end former partly in section.
Figure 18:
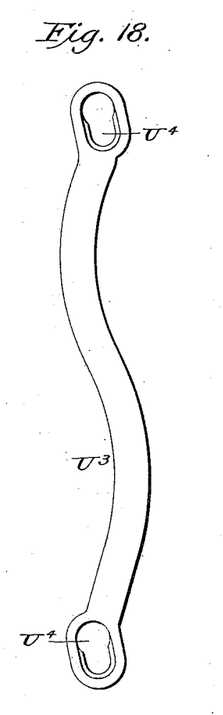
Fig. 18, a face view of the end former, and Fig. 19 a sectional view of the stock or head carrying the toe-pinchers.

The side lasting-jaws comprise a main body U, a series of longitudinal fingers U', a former $U^2$ to bear upon the backs of and to give the proper curvature to the row or line of fingers, and an end former $U^3$, having at each end a slot $U^4$, as shown in Figs. 1, 17, and 18. The slots in the former $U^3$ are each enlarged at their upper ends, so as to fit over the heads of pins or studs $U^5$, projecting from the outer face of the jaws, the pins being reduced in size immediately below the head, so that when the former is slipped onto or over the pins or studs and then moved lengthwise it will be effectually prevented from becoming accidentally detached. No broad claim is intended to be made herein to an end former.

Fitting in the support J is a hollow stem V, Figs. 1, 2, 3, 11, and 12, which receives the shank V' of the heel-wiper, the stem V being provided with a spring-catch $V^2$ to engage with or enter a notch in the body $V^3$ of the wiper. As shown in Figs. 6 and 7, the body $V^3$ comprises a back and sides and an open front and top, and hung or pivoted between the sides is a block $V^4$, the pin $V^5$, upon which the block swings, being mounted in slots in the sides of the body, so as to permit the block, with its pivot or pin, to move bodily back and forth relatively to the body $V^3$.

$V^6$ indicates a stem or rod projecting from the back of the block through the back of the body $V^3$ and encircled by a spring $V^9$, bearing against the body and a nut on the stem, the rod $V^6$ being carried by the pin $V^5$, before referred to. A set-screw $V^7$ at the upper end of the body $V^3$ limits the inward movement of the block $V^4$. Pivotally secured to the upper end of the block $V^4$ on its front face are the blades or wipers $V^8$ $V^8$.

It is of course to be understood that the machine will be provided with pinchers for stretching the upper upon the last, as in the patent above mentioned; but as they form no part of the present invention they are not shown or described herein.

Secured to the upright plate D is a scale-plate D', over which a pointer $D^2$, carried by the support I, is designed to move, as shown in Fig. 2, so that the operator may see at a glance how far to turn the screw to adapt the machine to different-sized lasts.

Having thus described my invention, what I claim is—

1. In a lasting-machine, the combination, with a last-support, of a stem mounted therein, a spring encircling the stem and serving to maintain the latter in its extended position, a shaft, and an arm secured to the shaft and engaging the stem, so as to retract the latter upon the rotation of the shaft.

2. In a lasting-machine, the combination, with a last-support and a supplemental support for the toe of the last, of means for adjusting said supports toward and from each other and an extensible shaft extending from one support to the other for retracting the said supports, all substantially as shown.

3. In a lasting-machine, the combination, with the vertically-moving support or head I, of the swinging head carrying the toe-pinchers, and an adjusting-nut provided with a spring and spring-socket and adapted to connect the swinging head with the support I.

4. In a lasting-machine, the combination, with the vertically-moving head or support I, of the horizontally-moving head carried thereby and the swinging head mounted in the horizontally-movable head and carrying the toe-lasting mechanism.

5. In a lasting-machine, the combination, with the head or support I, carrying the toe-lasting mechanism and the toe-support for the last, of a head or support H, carrying the last-jack, a head or support J, provided with a heel-lasting mechanism, and a screw-rod constructed substantially as shown and engaging the supports H, I, and J.

6. In a lasting-machine, the hollow arm $K^2$, provided with a plate K' and lugs $K^5$, a stem $K^3$, having an eye at its outer end and provided also with perforated lug $K^8$, and a screw-stem $K^6$, engaging the lugs on the hollow arm and the stem.

7. In a lasting-machine, the combination, with the threaded supports H, I, and J, of the threaded shaft $P^8$, a sleeve $J^8$, a set-screw $J^{11}$, carried by the sleeve and engaging the shaft, and means for rotating the shaft.

8. In a lasting-machine, the combination, with the main frame, of jaw-supports mounted thereon so as to slide toward and from each other and provided with side lasting-jaws, a disk provided with a handle, and links secured at their inner ends to the disk and connected at their outer ends to the jaw-supports by adjustable connections, all substantially as shown.

9. In a lasting-machine, the combination, with the supports H, I, J, and K K, of a disk, a handle for operating the disk, and links $I^8$ and $I^{10}$ $I^{10}$, connecting, respectively, the supports J and K K with the disk, and a link $M^9$, connecting the disk with the toe-lasting mechanism that is carried by the support I.

10. In a lasting-machine, the combination, with the supports H, I, J, and K K, of a disk provided with a handle and carried by the support I, a shaft journaled in the support I and adapted to actuate the toe-lasting mechanism carried thereby, links connecting the supports J and K K with the disk, and a link connecting the disk with the shaft that operates the toe-lasting mechanism.

11. In a lasting-machine, the pivoted heel-wipers, in combination with the adjustable block to which said wipers are pivoted, a stem having a socket in its upper end to receive the block and wipers, a support J, in which said stem is clamped, and means for raising and lowering the support.

12. In a lasting-machine, the combination, with the stem having a socket at its upper end and provided with elongated slots, of a block mounted in the socket and provided with a pin the ends of which extend through the slots, a stem secured to the pin and projecting through the rear wall of the socket-piece, a spring encircling said stem, and wipers pivoted to the upper end of the block.

13. In a lasting-machine jaw, the combination, with the main stock or body having a series of adjustable fingers and with pins or studs reduced in diameter, as shown, of the removable end former provided with elongated and countersunk openings at its ends to fit upon the points or studs.

14. In a lasting-machine, the combination, with a last-support and supports for the toe and heel wipers, of a single screw for adjusting all of said supports toward and from one another, substantially as described.

15. In a lasting-machine, the combination, with a last-support and supports for the toe and heel wiping mechanisms, of a pivoted head carrying the toe-wipers, a screw for adjusting the supports, and an inclined way or guide adapted to move the head inward and outward as it is raised and lowered.

16. In a lasting-machine, the combination, with a last-support and supports for the heel and toe wiping mechanisms, of a screw for moving all of said supports varying distances, whereby the relative positions of the supports are maintained under all adjustments.

17. In a lasting-machine, the combination, with a last-support, supports for the heel and toe wiping mechanisms, and supports for the side lasting-jaws, of a screw for adjusting the last-support and the heel and toe mechanism supports, a cam-disk having a lever, links connecting the disk with the jaw-supports and the heel-mechanism support, and a link connecting the disk with the toe-wiping mechanism.

18. The lasting-jaw support K, comprising a flat plate K', a hollow arm $K^2$, provided with lugs $K^5$ $K^5$, a stem $K^3$ having an eye $K^4$ and lug $K^8$, and a screw-stem $K^6$, engaging the lugs, all substantially as shown.

19. In a lasting-jaw support, the combination, with a stem $K^3$, having an eye $K^4$, of a collar $K^{10}$, intersecting the bore of the eye, and a screw $K^9$, passing through the collar and into the body of the eye.

20. The support or carrier I for the toe-lasting mechanism, comprising a body portion I', a hollow arm $I^2$, and a second hollow arm $I^3$, the inner end of the arm $I^3$ being set away from the front face of the body portion.

21. In combination with a hollow arm $I^2$, a head L, provided with hollow stem L', and separated arms $L^2$ $L^2$, the latter provided with a pin $L^3$, a case or shell $L^4$, mounted upon the pin $L^3$ and provided with rack-bar M, a shaft $M^4$, provided with pinion $M^3$, and the pinions M' and $M^2$, engaging, respectively, the rack M and the pinion $M^3$.

22. In combination with a hollow arm $I^2$, slotted, as at $L^7$, a hollow stem L', mounted in the arm and provided with a lug $L^6$, a spline or feather $L^5$, a rocking shell $L^4$, carried by the stem L' and provided with a rack-bar M, means for connecting the stud $L^6$ with the shell $L^4$ for rocking or tipping the latter, a shaft $M^4$, mounted in the stem L' and provided with a pinion $M^3$, and pinions $M^2$ M', mounted on the pivot of the rocking shell.

23. In combination with the longitudinal movable head L, the tipping shell $L^4$, the toe-pinchers stem M, movable therethrough, and a shaft carried by the head L and adapted, substantially as described, to operate the stem M regardless of its inclination.

24. The combination, with the longitudinally-movable head L, carrying the tipping shell $L^4$, pinchers-stock M, and the shaft $M^4$ for actuating the stock, of the adjustable inclined plate $N^4$, rod $N^2$, connected with the head L and engaging the inclined plate, and means for raising and lowering the head L.

25. In combination with a support I for the toe-lasting mechanism, a head L, mounted therein, and means, substantially such as shown, for raising and lowering the support and automatically moving the head inward and outward.

26. In combination with support I, a head L, mounted therein, means, substantially such as shown, for raising and lowering the support and automatically moving the head inward and outward, and an adjusting mechanism for varying the movement of the head.

27. In combination with stem L', carrying the slotted and graduated plate $M^{10}$, rocking shell $L^4$, provided with stud $M^{12}$ and plate $M^{13}$, and means for locking the parts in their adjusted positions.

28. In combination with a movable support, as I, carrying the toe-wiping mechanism, and a shaft $M^4$ for operating the latter, a movable last-support H, a cam-disk carried by the support I and connected with the shaft $M^4$, a support J for the heel-wiping mechanism, connected with the cam-disk, and a screw $P^8$, engaging the supports H I J.

29. In combination with a movable support I, carrying the toe-wiping mechanism, a cam-disk, and intermediate mechanism for actuating the latter, a last-support H, a support J for the heel-wiping mechanism, provided with a movable block $J^3$ for connection with the cam-disk, a sleeve $J^8$, carried by the support J and threaded to engage the block $J^3$, and a shaft $P^8$, having threaded portions $P^5$ and $P^6$ to engage the supports H and I and keyed or otherwise secured to the sleeve.

30. In combination with sleeve L' and stem L', threaded rods $L^9 L^9$, hand-nut $L^{10}$, engaging one of the rods and threaded internally, flanged nut $L^{12}$, screwing onto the other rod $L^9$, a nut $L^{13}$, screwing into the hand-nut and to bear against the flange on the inner end of nut $L^{12}$, and spring $L^{11}$, seated in the hand-nut and bearing against the inner end of the flanged nut.

31. In combination with body R', sleeve $R^3$, rod $R^5$, carried by the sleeve and provided with an adjusting-nut, a spring between the nut and a shoulder in the sleeve, and means for actuating the sleeve.

32. In combination with the main frame having a threaded opening, sleeve $P^3$, threaded externally, and shaft P, provided with handle $P^2$ and with wheel P'.

33. In combination with stud $K^{11}$, eccentric Q, mounted thereon and provided with holes $Q^3$, link $I^{10}$, connected with the stud $K^{11}$ by pin Q', and a spring locking-pin $Q^2$, carried by the link and adapted to engage the holes $Q^3$.

34. In combination with the longitudinally-movable and rotatable shaft $M^4$, a bushing keyed thereon and prevented from longitudinal movement, a crank-arm mounted upon the bushing, a cam-disk, and a link connecting the latter with the crank-arm.

35. In a lasting-machine, the combination, with the adjustable supports H I, of a scale D', a finger $D^2$, carried by the one of said supports, and means for moving one of said parts, as and for the purpose set forth.

In witness whereof I hereunto set my hand in the presence of two witnesses.

SETH BRAGGINS.

Witnesses:
H. M. GOODHUE,
SELDEN S. BROWN.